United States Patent [19]
Snyder

[11] 3,712,437
[45] Jan. 23, 1973

[54] HYDRAULIC CLUTCH WITH CENTRIFUGAL AND MANUAL VALVES

[75] Inventor: Kenneth E. Snyder, Tovares, Fla.
[73] Assignee: General Motors Corporation, Detroit, Mich.
[22] Filed: Sept. 28, 1970
[21] Appl. No.: 76,267

Related U.S. Application Data

[63] Continuation of Ser. No. 762,543, Sept. 25, 1968, abandoned.

[52] U.S. Cl. ......192/103 FA, 192/109 F, 192/113 B, 137/57, 137/625.69
[51] Int. Cl. ............................................F16d 43/284
[58] Field of Search ..........192/113 B, 106 F, 105 F, 192/103 FA, 109 F, 85 R, 3.5 FP

[56] References Cited

UNITED STATES PATENTS

| | | | |
|---|---|---|---|
| 2,144,074 | 1/1939 | Maybach | 192/103 |
| 2,275,204 | 3/1942 | Smirl | 192/103 |
| 2,328,091 | 8/1943 | Nutt et al | 192/103 |
| 2,771,976 | 11/1956 | Smirl | 192/85AA |
| 3,421,608 | 1/1969 | Gorder | 192/103 FA |

FOREIGN PATENTS OR APPLICATIONS

649,577  1/1951  Great Britain................192/103 FA

*Primary Examiner*—Benjamin W. Wyche
*Attorney*—E. W. Christen, A. M. Heiter and John P. Morgan

[57] ABSTRACT

A clutch for use with a throttle-controlled engine and a synchromesh transmission which includes a passage therethrough for the transmission of engine oil and uses the pressure thereof to move an annular piston for engaging, disengaging and slippingly engaging clutch driving and driven discs, the oil returning to the engine sump after flowing across the discs, serving as a coolant therefor. The clutch includes three spring-loaded valves, the first of which controls the inlet and the exhaust of the engine oil in response to full depressions of the clutch pedal and further variably regulates the pressure supplied to the second of the three valves in response to partial depressions of the clutch pedal. The second valve regulates the pressure of the oil on the annular piston in response to centrifugal force resulting from engine speed and further in response to the variable pressure controlled by the first valve, resulting in a change in stall speed. The third valve variably controls the volume of the coolant flowing across the clutch discs in response to centrifugal force resulting from engine speed.

10 Claims, 2 Drawing Figures

PATENTED JAN 23 1973
3,712,437
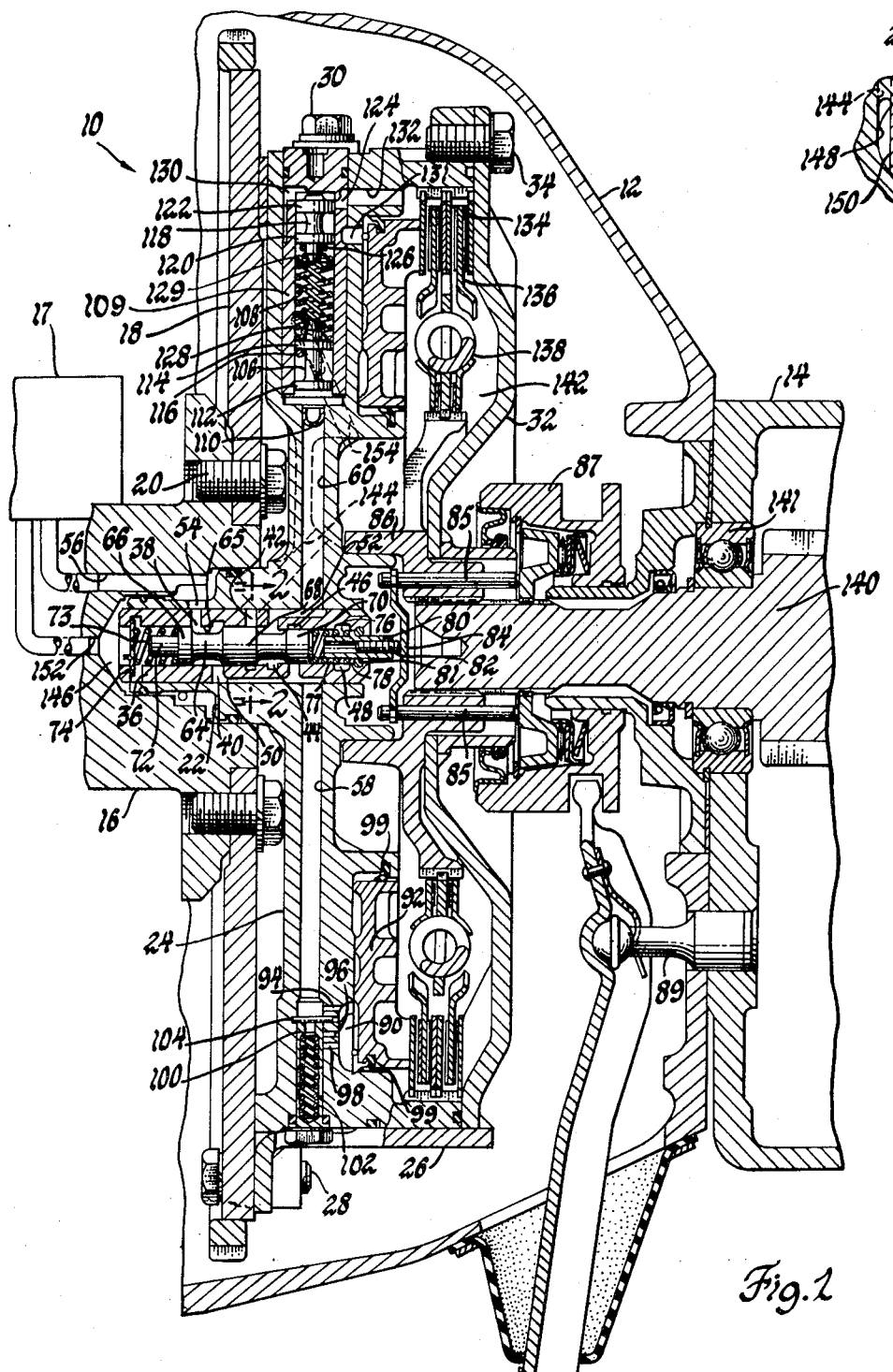
Fig.2
Fig.1
INVENTOR.
Kenneth E. Snyder
BY
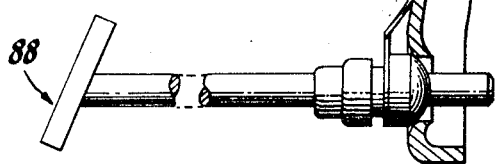
ATTORNEY the passage 60. Spaced flanges 112 and 114 of the plug 106 have disposed therebetween a stop pin 116 to limit the range of motion of the plug 106. A starting clutch regulator valve 118 is slidably mounted in the chamber 108 at the end opposite the plug 106. The valve 118 has flanges 120 and 122 formed on the ends thereof. A port 124 formed in the hub flange 24 is controlled by the flange 122. A light spring 126, mounted between the flange 114 of the regulator plug 106 and the flange 120 of the valve 118, biases the valve 118 radially outwardly toward the port 124. A second spring 128, mounted between the flange 114 of the plug 106 and a fixed pin 129, urges the regulator plug 106 radially inwardly from the starting clutch regulator valve 118.

The port 124 is opened, upon radial inward movement of the valve 118 and the flange 122, to a chamber 130 formed adjacent the valve 118, the chamber 130 communicating via a port 131 and an interconnecting annular recess 133 formed around the sleeve 109 with the annular chamber 90. The port 124 serves as an inlet into a coolant outlet passage 132 which delivers oil for lubrication and cooling purposes to the outer circumferential edge portion of the usual clutch drive discs 134. The discs 134 are splined for axial movement on the clutch drum 26 and are adapted to engage and be released from driven clutch discs 136. The driven discs 136 are carried by a vibration dampener assembly 138 mounted on the driven clutch hub 86 which, in turn, is mounted on the usual power delivery shaft 140 extending from the transmission housing 14 through a bearing 141. The cooling oil passes between the discs 134 and 136, one set of which includes radial grooves (not shown) formed thereacross, to a chamber 142 and thence through a passage 144 to an exhaust chamber 146 via a passage 148 (FIG. 2) resulting from a flat surface 150 formed on one side of the valve body 36. The oil is discharged from the exhaust chamber 146 via an exhaust passage 152 to a sump, such as the engine 17 sump.

A pressure relief passage 154 communicates between the chamber 142 and the chamber 108 in order to vent the variable portion of the chamber 108 intermediate the regulator plug 106 and the valve 118 to the lower pressure chamber 142.

OPERATION

The operation of the above-described clutch assembly will now be explained. Initially, once the engine has been started, the clutch pedal is fully depressed in order to disconnect the power delivery shaft 140 from the input shaft 16, permitting manual shifting of the transmission gears in the usual manner. Specifically, depressing the clutch pedal to the floor causes the linkage 88 to pivot about the pivot pin 89, moving the clutch throwout collar 87 to the left in FIG. 1. This pushes the actuator pins 85 and their associated valve actuator 84 to the left, contacting the calibrating screw 82 and causing the sleeve 80 to compress the spring 76 and contact the feed valve 64, moving it to the left toward the retainer 74. In this position the oil will flow from the servo-chamber 90 via the passage 94, the radial passage 58, passage 50, the port 42 and the chamber 77 through the exhaust port 48 to the engine 17 sump. This permits the driving and the driven clutch discs 134 and 136, respectively, to relax their grip on one another and, aided by the flow of coolant therepast, resulting in the annular piston 92 moving leftwardly in FIG. 1. Accordingly, the power delivery shaft 140 is no longer being driven by the rotating power input shaft 16, and the usual shifting may be accomplished.

Once the desired gear has been engaged and the clutch pedal has been released, the feed valve 64 will be moved axially to the right under the force of the spring 73 to substantially the position illustrated in FIG. 1. In this position, oil from the engine 17 oil pump (not shown) enters via the passage 56 through the ports 54, 38, 40, into the passage 50 and thence to the radially extending clutch pressure feed passage 58 and through the passage 94 into the servo-chamber 90. The pressure of the fluid in the chamber 90 causes the annular piston 92 to move to the right in FIG. 1, thereby engaging the driving and driven discs 134 and 136, respectively, which through the vibration dampener 138 and the driven clutch hub 86, rotates the power delivery shaft 140.

The oil under line pressure travels circumferentially around the annular chamber 90 to the port 131, the latter interconnecting with the annular recess 133 formed around the sleeve 109 which serves as an inlet into the chamber 130, forcing the regulator valve 118 radially inwardly against the force of the spring 126. This maintains the port 124 open and permits the oil to serve as a coolant by flowing into the passage 132 and thence through grooves or slots (not shown) formed in the driving or driven discs 136 or 134, respectively. The coolant is exhausted via the chamber 142, the passage 144, the passage 148 (FIG. 2), the discharge chamber 146 and the exhaust passage 152 back to the engine 17 sump.

Next, consider the vehicle being stopped, for example, at a traffic signal, with third gear engaged. The clutch pedal and its associated linkage 88 need not be depressed, as has been the case with synchromesh transmissions heretofore. Under these conditions, it may be noted in FIG. 1 that the regulator plug 106 will be subjected to fluid pressure, the fluid having entered via the inlet passage 56, the ports 54, 38 and 40, the passage 50, the cracked opening between the left hand edges of the land 70 and the port 46, the passages 52 and 60, and the fixed restriction 110 to the lower portion of chamber 108 beneath the flange 112. The regulator valve 118, in turn, will be urged outwardly by the spring 126 mounted between the regulator plug 106 and the valve 118. The outward movement of the valve 118 will decrease the area of the opening through the port 124 and the volume of the chamber 130, causing the pressure therein to change and to be effective back through the port 131 to the annular chamber 90.

At this point, the pressure in the chamber 90 on the annular piston 92 is such that the stall speed will be approximately 1,200 R.P.M. In other words, with the brake on and the throttle moved via linkage from the accelerator pedal toward a fully open position, the engine can run up to 1,200 R.P.M. before the slipping engagement between the driving discs 134 and the driven discs 136 limits the engine speed at 1,200 R.P.M. This speed will be maintained until the vehicle speed and the corresponding power delivery shaft 140 speed reach the equivalent of 1,200 R.P.M. at which time the clutch will lock up and a 1 to 1 drive ratio becomes effective.

HYDRAULIC CLUTCH WITH CENTRIFUGAL AND MANUAL VALVES

This application is a continuation of Ser. No. 762,543, filed Sept. 25, 1968, now abandoned.

This invention relates generally to a vehicular power train including a throttle-controlled engine and a synchromesh transmission and more particularly to an improved hydraulic clutch for use therewith.

As is well known to the general public, having to depress a typical vehicle clutch pedal each time that a stop or substantial speed change is made can become bothersome to the operator, particularly when driving busses, trucks or passenger cars having synchromesh transmissions which are used primarily in intracity travel. Hence, it is advantageous to eliminate the need for a clutch pedal once a particular gear ratio has been selected, regardless of stops. Also, it is desirable, when the clutch pedal is manually actuated, that the pedal depressing effort be minimal, i.e., comparable to the effort required to depress the usual accelerator pedal. It is also desirable that coolant be supplied to the clutch discs in controlled quantities sufficient to prevent "burning" of the discs during the various operating conditions.

Accordingly, a general object of the invention is to provide a clutch control system for a vehicular power train which accommodates stoppage of a motor vehicle with the manual transmission in gear, without manually releasing the clutch and without stalling the engine.

Another object of the invention is to provide a clutch control system which permits a "no pedal" start-up of the vehicle with the manual transmission in gear engagement.

A further object of the invention is to provide a clutch control system which uses engine oil to actuate the clutch and wherein the clutch-engaging pressure is automatically regulated so as to be just sufficient to cause the clutch discs to carry the torque being transmitted, thereby providing for smooth clutch engagement.

Still another object of the invention is to provide a clutch control system wherein the clutch piston force tending to engage the clutch is regulated by a centrifugally controlled valve and modified by clutch pedal position.

A further object of the invention is to provide a clutch control system wherein the same fluid which actuates the clutch serves as a coolant for the clutch discs and the volume thereof for various stall speeds is automatically regulated in response to the action of centrifugal force.

Other objects and advantages of the invention will become more apparent when reference is made to the following specification and accompanying drawings wherein:

FIG. 1 is a cross-sectional view of a clutch assembly embodying the invention; and FIG. 2 is a cross-sectional view taken along the plane of line 2—2 of FIG. 1, as if FIG. 1 were a full round view, and looking in the direction of the arrows.

Referring now to the drawings in greater detail, FIG. 1 illustrates a clutch assembly 10 including a housing 12 operatively connected at one end thereof to a multi-speed transmission 14 of the manually shiftable synchromesh type. A power input shaft 16, preferably the engine crankshaft of a throttle-controlled engine, represented schematically as 17, drives a drive plate 18 which is secured thereto by suitable means, such as bolts 20. A drive clutch assembly includes a clutch hub 22 piloted in the shaft 16 and having an outwardly extending flange 24. A clutch drum 26 is connected to the drive plate 18 by bolts 28 and connected to the flange 24 of the hub 22 by bolts 30. A cover 32 is secured to the drum 26 at the right hand end thereof (FIG. 1), by bolts 34.

A valve body 36, press-fitted in the axial bore of the hub 22 includes a plurality of ports 38, 40, 42, 44, 46 and 48, and passages 50 and 52 formed therein. Ports 42 and 48 are exhaust ports. The port 38 communicates with a port 54 formed in the hub 22 and is adapted to receive fluid under pressure through the port 54 and a pressure supply passage 56 from the engine 17. The passage 50 connects the port 40 to the port 46 and communicates with a radial clutch pressure feed passage 58 formed in the hub flange 24. The passage 52 communicates between the port 44 and a radial control passage 60 formed in the flange 24.

A feed valve 64, axially movable in the stepped bore 65 of the valve body 36, includes spaced lands 66, 68 and 70 and a stop member 72 formed thereon. The lands 66 and 68 are equal in diameter and are greater in diameter than the land 70. A spring 73, mounted between a retainer 74 and the land 66, yieldably biases the valve 64 to the right in FIG. 1. The spring 73 is substantially easier to compress than the usual clutch apply spring found in manual clutches. A second spring 76, mounted in the smaller portion 77 of bore 65 between the land 70 and a flange 78 formed on a sleeve 80 which is slidably mounted in the bore 77 and sealed by a seal 81 adjacent the right hand end of the feed valve 64, serves to help vary the opening between the edges of the port 46 and the land 70. A calibrating screw 82, screw-threaded into the sleeve 80, extends outwardly from the sleeve 80 into contact with an axially movable valve actuator 84 carried by axially movable actuator pins 85 slidably supported in a driven clutch hub 86. The actuator pins 85 are slidably moved by a clutch throwout collar 87 manually actuated by the usual clutch pedal assembly 88, the latter being pivotably mounted on a suitable pivot pin 89 extending from the transmission housing 14 into the clutch housing 12.

The passage 58 is adapted to be connected to a clutch servo-chamber 90 formed between an annular piston 92 and the hub flange 24, through restricted passages 94, 96 and 98. Suitable annular seals 99 are mounted on the inner and outer surfaces of the annular piston 92. The clutch pressure feed passage 58 is continuously connected to the servo-chamber 90 through the restricted passage 94. A speed-responsive valve 100 is urged by a spring 102 against a stop pin 104 to initially block off passages 96 and 98 when the rotatable flange member 24 is at rest. As the flange 24 speeds up in rotation, the valve 100 will move outwardly under the action of centrifugal force against the spring 102 to first open the passage 96 and, upon further increase in the speed of rotation, to open the passage 98 to communication with the radial passage 58.

A regulator plug 106 is slidably disposed in a chamber 108 of a sleeve 109 fixed in the flange member 24, adjacent the outermost end of the passage 60 and is subjected, via a restriction 110, to fluid from Referring again to FIG. 1, it may be noted that the right end of the feed valve 64 and the left end of the sleeve 80 are spaced apart from one another. Until such time as they come into contact, the above-mentioned pressure in the radial control passage 60 and, hence, beneath the plug 106 may, if desired, be varied by compressing the spring 76 through slight depressions of the foot pedal.

Compressing the spring 76 in this manner increases its spring force and has the effect of decreasing the rightward biasing force of the regulating spring 73 on the valve 64, the same being opposed by the leftward pressure effect on the differential area between the lands 68 and 70 and the biasing force of the now variously compressed spring 76. The result is a variable reduction in the pressure under the regulator plug 106 in accordance with the formula $S1 + P(\Delta A) = S2$, wherein $S1$ is the force of the spring 76, $P(\Delta A)$ is the leftward variable fluid pressure on the above differential area, and $S2$ is the substantially constant rightward force of the stronger regulating spring 73.

Reduced pressure on the plug 106 reduces the spring 126 force on the regulating valve 118, permitting it to move radially inwardly. This enlarges the opening into the port 124, thereby, reducing the pressure in the now larger chamber 130 and, accordingly, the pressure back through the port 131 and the annular chamber 90. The resultant reduced pressure on the annular piston 92 causes the latter to relax the frictional grip between the clutch discs 134 and 136.

It may be noted that at the same time that the pressure under the regulator plug 106 is thus reduced, an increase in engine 17 speed and, correspondingly, an increase in the power input shaft 16 speed, will cause the regulator plug 106 to move radially outwardly under the action of centrifugal force, tending to move the valve 118 outwardly, progressively closing off the port 124 and, thereby increasing the pressure in the chambers 130 and 90, again causing the piston 92 to increase the pressure between the driving discs 134 and the driven discs 136.

The overall result of the above changes in control pressure and centrifugal force on the valve 118 is that the pressure in the chamber 90 on the annular piston 92 and, hence, on the slippingly engaged clutch discs 134 and 136, will produce a new maximum stall speed of 2,000 R.P.M., this now being the upper limit at which the engine will be held by the clutch before a 1 to 1 drive ratio is attained. It is in this 1,200 to 2,000 R.P.M. range, called the "performance range," while the spring 76 is being actuated by slight movements of the clutch pedal 88, causing the valve 64 to function as a regulating valve by regulating the flow of oil through the cracked opening between the land 70 and the port 46 to the port 44, varying the fluid pressure on the differential area between the lands 68 and 70, and thence flowing to the passages 52 and 60 to vary the outward fluid pressure on the regulator plug 106, that the engine may be revved up to deliver greater torque, as might be required for a fast start, or for a steep hill condition where the low performance 1,200 R.P.M. stall speed might be insufficient to move the vehicle while the engine speed is held at 1,200 R.P.M. under a full throttle condition, the clutch assembly 10 functioning, in effect, similarly to a fluid coupling of an automatic transmission.

Once contact between the sleeve 80 and the valve 64 is made, flow into the radial control passage 60 is cut off and, as the valve 64 is moved to its leftmost position by further depression of the clutch pedal, fluid in the control passage 60 will exhaust via the passage 52, the port 44, the reduced diameter between the lands 68 and 70, and the exhaust port 42 to the engine 17 sump, and the influx of fluid under line pressure will be stopped by virtue of the land 68 blocking the port 40. This produces the usual synchromesh NEUTRAL condition, the driving clutch discs 134 now being disengaged from the driven discs 136 inasmuch as there is no pressure on the annular piston 92, and the usual shifting to a different gear ratio may be accomplished.

Referring now to the lower portion of FIG. 1, as engine speed increases, driving the input shaft 16 and the associated driving hub flange 24 at a faster rate, the speed-responsive valve 100 will move outwardly under the action of centrifugal force against the force of the spring 102, thereby opening first the passage 96 and, subsequently, the passage 98 to the passage 58. This, of course, increases the flow of oil into the servo-chamber 90 which serves as additional coolant for the clutch discs 134 and 136, preventing "burning" thereof while slippage between the discs 134 and 136 is increased at the resultant higher stall speeds.

It should be apparent that the invention provides a novel clutch assembly which, once a gear ratio has been selected, incorporates the advantages of an automatic transmission in that the clutch pedal need not be depressed in order to bring the vehicle to a full stop. This, obviously, represents a substantial benefit insofar as the use of commercial vehicles and busses in city traffic is concerned.

It should also be apparent that, when desired, the clutch pedal may be used to control an internal clutch regulating means to vary the stall speed and produce a high performance operation.

It should be further apparent that the invention provides automatic coolant control means for the clutch discs, depending upon engine speed, resulting in extended clutch disc life.

It should also be apparent to those skilled in the art that the spring arrangement involved in the invention is such that it is substantially easier to actuate the clutch foot pedal than is the case with prior manual clutches having heavy clutch apply springs.

While but one embodiment of the invention has been disclosed and described, it is apparent that other modifications of the invention are possible.

I claim:

1. A clutch mechanism for a power train, said clutch mechanism comprising a source of fluid under pressure, a power input shaft, a power output shaft, a clutch pedal, driving and driven clutch discs, piston means for at times engaging and at times disengaging said driving and driven discs, a driving hub connecting said driving discs to said input shaft for rotation therewith, a driven hub connecting said driven discs to said power output shaft for at times driving said power output shaft, a chamber formed adjacent said piston means, first passage means (56, 54, 38, 40, 50, 58, 94, 90) for communicating said fluid under pressure from said source of fluid to said chamber, first valve means (64) operatively connected to said first passage means for controlling the flow of fluid through said first passage means, second passage means (131, 130, 124, 132, 142, 144, 148, 146, 152) communicating said fluid from said chamber back to said source past said driving and driven discs, thereby cooling said driving and driven discs, second valve means (106, 118) responsive to centrifugal force and operatively connected to said second passage means for varying the pressure in said chamber under the action of centrifugal force, third passage means (70/46, 52, 60, 110, 108) for at times communicating said fluid between said first passage means and the radial inner end of said second valve means, biasing means operatively connected to said clutch pedal and said first valve means for causing said first valve means to regulate the fluid pressure on said radial inner end of said second valve means through said third passage means in response to manual depression of said clutch pedal, thereby further varying the pressure in said chamber, and third valve means (100) responsive to centrifugal force and operatively connected to said first passage means for varying the flow of fluid from said first passage means to said chamber to control the amount of coolant supplied through said second passage means to said driving and driven discs in response to said centrifugal force.

2. The clutch mechanism described in claim 1, wherein said piston means includes an annular piston positioned adjacent said driving clutch discs, and seals mounted on the inner and outer circumferential surfaces of said annular piston.

3. The clutch mechanism described in claim 1, wherein said first mentioned passage means includes a fixed restriction (94), and a plurality of restrictions (96, 98) communicating between said first passage means and said chamber in response to movement of said third valve means (100) therepast.

4. A power train comprising a throttle-controlled engine including a crankshaft and a source of fluid under pressure, a synchromesh transmission and a hydraulic clutch, said hydraulic clutch including a power input shaft operatively connected to said crankshaft, a power output shaft operatively connected to said synchromesh transmission, clutch driving means connected to said crankshaft, driven means connected to rotate said power output shaft upon engagement therewith by said clutch driving means, first passage means (56, 54, 38, 40, 50, 58, 94, 90, 131, 130, 124, 132, 142, 144, 148, 146, 152) for transmitting said fluid from said source past said driving and driven means back to said source, first (64) and second (106, 118) valve means and second passage means (70/46, 44, 52, 60) communicating therebetween, a clutch pedal operatively connected to said first valve means, said first valve means being operatively connected to said first and second passage means for permitting said fluid to enter said first and second passage means when said clutch pedal is in a partially or fully retracted position and to exhaust from said first passage means only when said clutch pedal is in a fully depressed position, said second valve means being influenced by the regulated flow of said fluid past said first valve means into said second passage means to produce a first predetermined stall speed when said clutch pedal is fully retracted and a variable higher stall speed when said clutch pedal is variably partially depressed, said driving means being disengaged when said clutch pedal is fully depressed.

5. The power train described in claim 4, and additional valve means (100) responsive to centrifugal force reflective of the speed of said engine for varying the rate of flow of said fluid for automatically cooling said driving and driven means.

6. A hydraulic clutch device for a power train including a source of fluid under pressure, said clutch device comprising a clutch pedal, a power input shaft, a power output shaft, driving and driven means for at times interconnecting and at times disconnecting said input and output shafts, and valve means (106, 118, 64) operatively connected to said clutch pedal and to said driving and driven means for regulating the pressure of said fluid on said driving means, the pressure required for frictional engagement between said driving means and said driven means being variable to provide selected operational stall speeds between predetermined limits in response in part to input shaft speed and in part to the influence of partial depressions of said clutch pedal on said valve means, said valve means including first (106, 118) and second (64) spring-loaded valve means and said second spring-loaded valve means including a feed valve having lands and recessed portions formed thereon cooperating with inlet and outlet ports for varying the pressure of said fluid on said first spring-loaded valve means in response to said partial depressions of said clutch pedal and for controlling the inlet and exhaust of said fluid in response to full depressions of said clutch pedal, a first spring (76) operatively connected between said feed valve and said clutch pedal for resisting said partial depressions of said clutch pedal, and a second spring (73) positioned intermediate said feed valve and a fixed abutment.

7. A power train comprising a throttle-controlled engine including an engine shaft and a source of fluid under pressure, a synchromesh transmission and a hydraulic clutch, said hydraulic clutch including a clutch pedal and linkage extending therefrom, a power input shaft operatively connected to said engine shaft, a power output shaft operatively connected to said synchromesh transmission, driving and driven means for at times interconnecting and at times disconnecting said input and output shafts, valve means (106, 118) operatively connected to said driving and driven means for regulating the pressure of said fluid on said driving means for engaging said driven means to increase the pressure proportional to increasing centrifugal force indicative of engine speed and additional valve means (64, 76, 73) operatively connected to said first-mentioned valve means and to said clutch pedal for varying the effect of said increasing centrifugal force to reduce the pressure of said fluid being regulated by said first-mentioned valve means on said driving means at all speeds in proportion to controlled manually variable partial depressions of said clutch pedal while maintaining said increasing pressure proportional to increasing speeds at lower pressure values to permit increased speeds without stalling the engine, said additional valve means including a slidably mounted valve body, a first spring (76) positioned between said clutch pedal linkage and one end of said slidably mounted valve body, a fixed spring retainer, and a second spring (73) positioned intermediate the other end of said slidably mounted valve body and said fixed spring retainer, there being a first predetermined stall speed present when said clutch pedal is fully retracted and a second predetermined stall speed discernible when said first spring is fully compressed by movement of said clutch pedal just prior to the compression of said second spring by continued movement of said clutch pedal.

8. A power train comprising a throttle-controlled engine including an engine shaft and a source of fluid under pressure, a synchromesh transmission and a hydraulic clutch, said hydraulic clutch including a clutch throw-out collar axially movable in response to movement of a clutch pedal, a power input shaft operatively connected to said engine shaft, a power output shaft operatively connected to said synchromesh transmission, driving and driven means for at times interconnecting and at times disconnecting said input and output shafts, first valve means (106, 118) operatively connected to said driving and driven means for regulating the pressure between said driving and driven means to eliminate having to depress said clutch pedal to disengage said driving and driven means to prevent the engine from stalling by reducing the pressure between said driving and driven means to limit reduction of the speed of said driving means as the speed approaches engine stall speed to prevent reaching engine stall speed, said first valve means including a first spring-loaded regulating valve means (106, 128, 118) radially located adjacent said driving and driven means for regulating the pressure of said fluid on said driving means in response to centrifugal force, and second valve means (64) operatively connected to said first valve means and to said clutch pedal for regulating fluid pressure influencing said first valve means by causing said first valve means to further regulate the pressure of said fluid on said driving means to vary the stall speed between predetermined limits in response to controlled manually variable partial depressions of said clutch pedal, said second valve means including a second spring-loaded regulating valve means (64, 76, 73) located adjacent said first valve means for reducing the pressure of said fluid influencing said first valve means in response to said manually variable partial depressions of said clutch pedal, the effect of centrifugal force on said first valve means being reduced by said variable pressure of said fluid from said second valve means, said second spring-loaded regulating valve means including a slidably mounted valve body, a first spring (76) positioned intermediate said clutch throw-out collar and one end of said slidably mounted valve body, a fixed spring retainer, and a second spring (73) positioned intermediate the other end of said slidably mounted valve body and said fixed spring retainer, there being a first predetermined stall speed present when said clutch pedal is fully retracted and a second predetermined stall speed discernible when said first spring is fully compressed by movement of said clutch pedal just prior to the compression of said second spring by continued movement of said clutch pedal.

9. A hydraulic clutch device for a power train including a source of fluid under pressure, said clutch device comprising a clutch pedal, a power input shaft, a power output shaft, driving and driven means for at times interconnecting and at times disconnecting said input and output shafts, and valve means (106, 118, 64) operatively connected to said clutch pedal and to said driving and driven means for regulating the pressure of said fluid on said driving means, the frictional contact between said driving means and said driven means being variable to provide selected operational stall speeds between predetermined limits in response in part to input shaft speed and in part to the influence of variable manual partial depressions of said clutch pedal on said valve means, said valve means including first (106, 118, 128) and second (64, 76, 73) spring-loaded valve means and said second spring-loaded valve means including a feed valve (64) having lands and recessed portions formed thereon cooperating with inlet and outlet ports for varying the pressure of said fluid on said first spring-loaded valve means in response to said variable manual partial depressions of said clutch pedal and for controlling the inlet and exhaust of said fluid in response to full depression of said clutch pedal, a clutch throw-out collar mechanism slidable mounted on said power output shaft and operatively connected to said clutch pedal, and spring means (76) disposed between one end of said feed valve and said clutch throw-out collar mechanism for variably moving said feed valve relative to said ports in response to said variable manual partial depressions of said clutch pedal.

10. The device described in claim 6, wherein said driving and driven means includes driving discs and driven discs and an annular piston for moving said driving discs into slipping engagement with said driven discs in response to the pressure of said fluid so long as said spring means is not fully compressed between said feed valve and said clutch throwout mechanism.

* * * * *